(12) United States Patent
Chung

(10) Patent No.: US 11,425,347 B2
(45) Date of Patent: Aug. 23, 2022

(54) PROJECTOR AND PROJECTOR BOOTING METHOD

(71) Applicant: Coretronic Corporation, Hsin-Chu (TW)

(72) Inventor: Tzu-Hai Chung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/681,791

(22) Filed: Nov. 12, 2019

(65) Prior Publication Data

US 2020/0162708 A1    May 21, 2020

(30) Foreign Application Priority Data

Nov. 19, 2018   (CN) .......................... 201811373662.8

(51) Int. Cl.
*H04N 9/31*   (2006.01)

(52) U.S. Cl.
CPC ................................ *H04N 9/3155* (2013.01)

(58) Field of Classification Search
CPC ....... H04N 21/42204; H04N 21/42222; H04N 21/41264
See application file for complete search history.

(56) References Cited

U.S. PATENT DOCUMENTS

| | | | | |
|---|---|---|---|---|
| 10,491,852 | B1* | 11/2019 | Hung | ................. H04N 21/4852 |
| 2007/0229771 | A1 | 10/2007 | Fujimori | |
| 2016/0150411 | A1* | 5/2016 | Liu | ..................... H04L 63/0853 726/4 |
| 2017/0152697 | A1* | 6/2017 | Dehelean | .......... G07C 9/00309 |
| 2020/0151431 | A1* | 5/2020 | Hassan | .............. G06K 9/00228 |

FOREIGN PATENT DOCUMENTS

| | | |
|---|---|---|
| CN | 1629720 | 6/2005 |
| CN | 101661210 | 3/2010 |
| CN | 102572346 | 4/2015 |
| CN | 104820494 | 8/2015 |
| CN | 104954558 | 9/2015 |
| CN | 107065679 | 8/2017 |
| CN | 107309874 | 11/2017 |
| CN | 207354414 | 5/2018 |
| CN | 108701180 | 10/2018 |
| EP | 2479642 | 7/2012 |
| TW | 200601065 | 1/2006 |

OTHER PUBLICATIONS

"Office Action of China Counterpart Application", dated May 24, 2021, p. 1-p. 15.
"Office Action of China Counterpart Application", dated May 6, 2022, p. 1-p. 13.

* cited by examiner

*Primary Examiner* — Samira Monshi
(74) *Attorney, Agent, or Firm* — JCIPRNET

(57) ABSTRACT

The disclosure proposes a projector and a projector booting method. The projector includes a receiver device, a storage device, and a processor, which is coupled to the receiver device and the storage device. The receiver device receives an input data. The processor is used for comparing the input data with a preset data in the storage device. The processor starts a timer after determining that the input data matches the preset data. The processor transmits a light source driving signal to a light source actuator to turn on a light source when the processor receives a booting signal before the timer expires. The disclosure can prevent the projector from being unintentionally turned on.

18 Claims, 2 Drawing Sheets

PROJECTOR AND PROJECTOR BOOTING METHOD

CROSS-REFERENCE TO RELATED APPLICATION

This application claims the priority benefit of China application serial no. 201811373662.8, filed on Nov. 19, 2018. The entirety of the above-mentioned patent application is hereby incorporated by reference herein and made a part of this specification.

BACKGROUND

Technical Field

The disclosure relates to a projector and a projector booting method, and more particularly to a projector and a projector booting method capable of pre-confirming whether to authorize use before starting up the projector.

Description of Related Art

Projection light from a laser projector or other high-brightness projectors may cause damage to the eyes when directly shone onto the eyes. If someone is standing in the projection area of the projector and the projector is turned on under an unintentional situation (for example, accidentally touching the projector power button), damage to the eyes may occur.

The projector may be prevented from being unintentionally turned on by locking the projector's buttons or disabling the remote control function, and turning the projector on and off may be controlled by a control software. However, this method is relatively less convenient. On the other hand, to prevent unauthorized use of the projector, a projection image is required to input a password through an on-screen display (OSD), but since the projector cannot be used during this period, power is wasted. Therefore, methods of preventing unintentionally turning on the projector should goals for persons skilled in the art to strive for.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projector and a projector booting method capable of preventing the projector from being unintentionally started up.

The disclosure provides a projector, which includes a receiver device, a storage device, and a processor. The processor is coupled to the receiver device and the storage device. The receiver device receives input data. The processor is used for comparing the input data with a preset data in the storage device. The processor starts a timer after determining that the input data matches the preset data. The processor transmits a light source driving signal to a light source actuator to turn on a light source when the processor receives a booting signal before the timer expires.

The disclosure provides a projector booting method, used for a projector including a receiver device, a storage device, and a processor. The processor is coupled to the receiver device and the storage device. The projector booting method includes the following steps. An input data is received by the receiver device. The input data is compared with a preset data in the storage device by the processor. A timer is started by the processor after determining that the input data matches the preset data. A light source driving signal is transmitted to a light source actuator to turn on a light source by the processor when the processor receives a booting signal before the timer expires.

Based on the above, the projector and the projector booting method of the disclosure compares the input data with the preset data. The processor starts the timer after determining that the input data matches the preset data. A booting operation is executed to turn on the light source only if the processor receives the booting signal before the timer expires.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned and other features of the disclosure more comprehensible, several embodiments accompanied with drawings are described in detail as below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
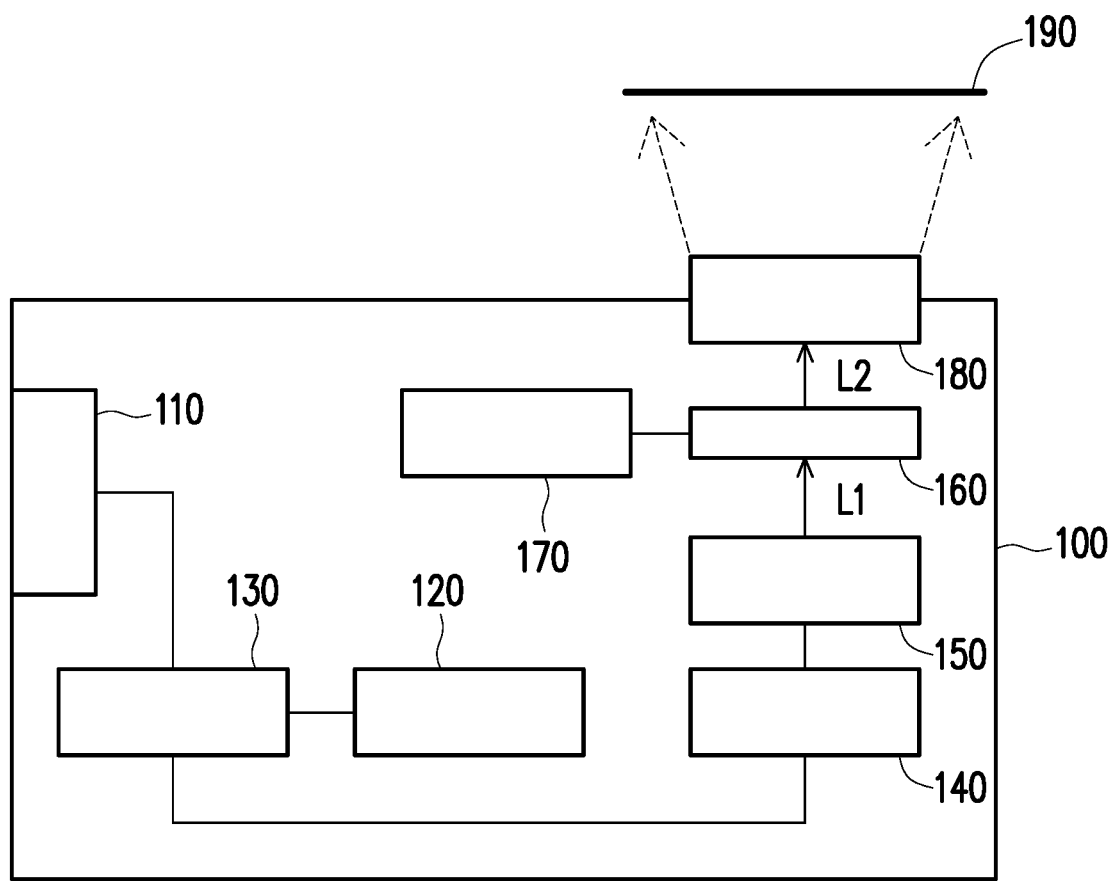
FIG. 1 is a block diagram of a projector according to an embodiment of the disclosure.

FIG. 1 is a block diagram of a projector according to an embodiment of the disclosure.

Referring to FIG. 1, a projector 100 of an embodiment of the disclosure includes a receiver device 110, a storage device 120, a processor 130, a light source actuator 140, a light source 150, a light valve 160, an image input interface 170, and a projector lens 180. The processor 130 is, for example, a microprocessor control unit (MCU), a central processing unit (CPU), other programmable general purpose or special purpose microprocessor such as a programmable controller, an application specific integrated circuits (ASICs), a programmable logic device (PLD), other similar device, or a combination of these devices. The storage device 120 is, for example, an electronically-erasable programmable read-only memory (EEPROM), a removable random access memory (RAM), a read-only memory (ROM), a flash memory, other similar element, or a combination of the above elements.

The receiver device 110 can receive the input data (not shown) input by the user, and the processor 130 compares the input data with the preset data pre-stored in the storage device 120. The processor 130 connects to a timer (not shown). After determining that the input data matches the preset data (i.e., authentication passed). The processor 130 starts the timer so that the user may press a booting button used for controlling the starting up of the projector within a predetermined time. The processor 130 transmits a light source driving signal to the light source actuator 140 to control the turning on of the light source 150 when the processor 130 receives a booting signal (i.e., the user has pressed the booting button) before the timer 130 expires. The light source 150 emits an illumination beam L1 and transmits the illumination beam L1 to the light valve 160 after the light source 150 is turned on. The light valve 160 can be used for modulating the illumination beam L1. If an image signal source (for example, an external computer, a smartphone, etc.) transmits an image signal via the image input interface 170 to the projector 100 and the image signal is inputted into the light valve 160 from the image input interface 170, the light valve 160 will convert the illumination beam L1 into an image beam L2. The image beam L2 is then projected through the projector lens 180 onto a projector screen 190 or other projection surface, such as a wall surface.

It is worth noting that if the user presses the booting button after the timer expires to allow the processor 130 to receive the booting signal, the processor 130 does not transmit the light source driving signal to the light source actuator. If the user intends to start up the projector, the user is required to re-input the input data matching the preset data and press the booting button before the timer expires.

In an embodiment, the receiver device 110 includes an infrared sensor. A user presses the buttons of the remote control of the projector 100 and input a sequence as the input data. The preset data in the projector 100 is a preset button input sequence. The signal corresponding to the button input sequence is transmitted via the transmitter of the remote control and is received by the receiver device 110 at a predetermined time interval (for example, 10 seconds). For example, when the user inputs "123456" using the remote control within 10 seconds and the preset button input sequence in the projector 100 is "123456", the timer will be started and the user can press the booting button to start up the projector before the timer expires (for example, within five minutes).

In an embodiment, the receiver device 110 includes an image sensor (for example, an image capturing device). The hand gesture of the user is the input data, while the input data is the input image. The processor 130 executes image recognition on the input image to obtain the hand gesture of the user and the preset data is a preset hand gesture. When the hand gesture displayed by the user in front of the image sensor matches the preset hand gesture, the timer will be started and the user may press the booting button to start up the projector before the timer expires (for example, within five minutes).

In an embodiment, the receiver device 110 includes an image sensor (for example, an image capturing apparatus). A two-dimensional (2D) barcode (for example, a Quick Response (QR) code, but not limited thereto) is the input data, while the input data is a 2D barcode image captured by the image sensor. The processor 130 executes image recognition on the captured 2D barcode image and the default data is an information corresponding to the default 2D barcode image. When the information corresponding to the 2D barcode image captured by the user using the image sensor matches the default data, the timer will be started and the user may press the booting button to start up the projector before the timer expires (for example, within five minutes).

In an embodiment, the receiver device 110 includes a radio wave receiver, for example, a Radio Frequency Identification (RFID) reader. The input data is an identification code obtained from a radio wave and the preset data is a preset identification code. For example, when the user approaches an authorization proximity card to the receiver device 110, the processor 130 will determine that the identification code of the authorization proximity card matches the preset identification code. The timer will be started and the user may press the booting button to start up the projector before the timer expires (for example, within five minutes).

In an embodiment, the receiver device 110 includes a sound source receiver (for example, a microphone). The input data is a voice segment and the processor 130 executes voice recognition on the voice segment to obtain a voice command. The preset data is a preset voice command. When the voice command of the user matches the preset voice command (for example, "turn on"), the timer will be started and the user may press the booting button to start up the projector before the timer expires (for example, within five minutes).

In an embodiment, the receiver device 110 includes a wireless network module (for example, a Bluetooth module or a Wi-Fi module). The input data is a password and the preset data is a preset password. The user can connect to the projector 100 through other electronic devices (for example, a smartphone) to input the password. When the password is the same as the preset password, the timer will be started and the user may press the booting button to start up the projector before the timer expires (for example, within five minutes).

In an embodiment, the receiver device 110 includes a booting keypad. When the processor 130 receives a booting signal of the booting keypad for a predetermined number of times within a predetermined time interval (for example, the user presses the booting keypad 3 times within 5 seconds), the processor 130 will transmit the light source driving signal to the light source actuator 140 to turn on the light source 150.

In an embodiment, a receiver device 110 includes a booting button. When the processor 130 continuously receives a booting signal of the booting button within a predetermined time interval (for example, the user presses and holds the booting button for 3 seconds), the processor 130 will transmit the light source driving signal to the light source actuator 140 to turn on the light source 150.

Although the above embodiments illustrate that the processor 130 starts the timer so that the user has a period to press the booting button to start up the projector after determining that the input data matches the preset data, the disclosure is not limited thereto. In another embodiment, the processor 130 may also directly transmit the light source driving signal to the light source actuator 140 to turn on the light source 150, without waiting for the user to press the booting button, after determining that the input data matches the preset data.

Figure 2:
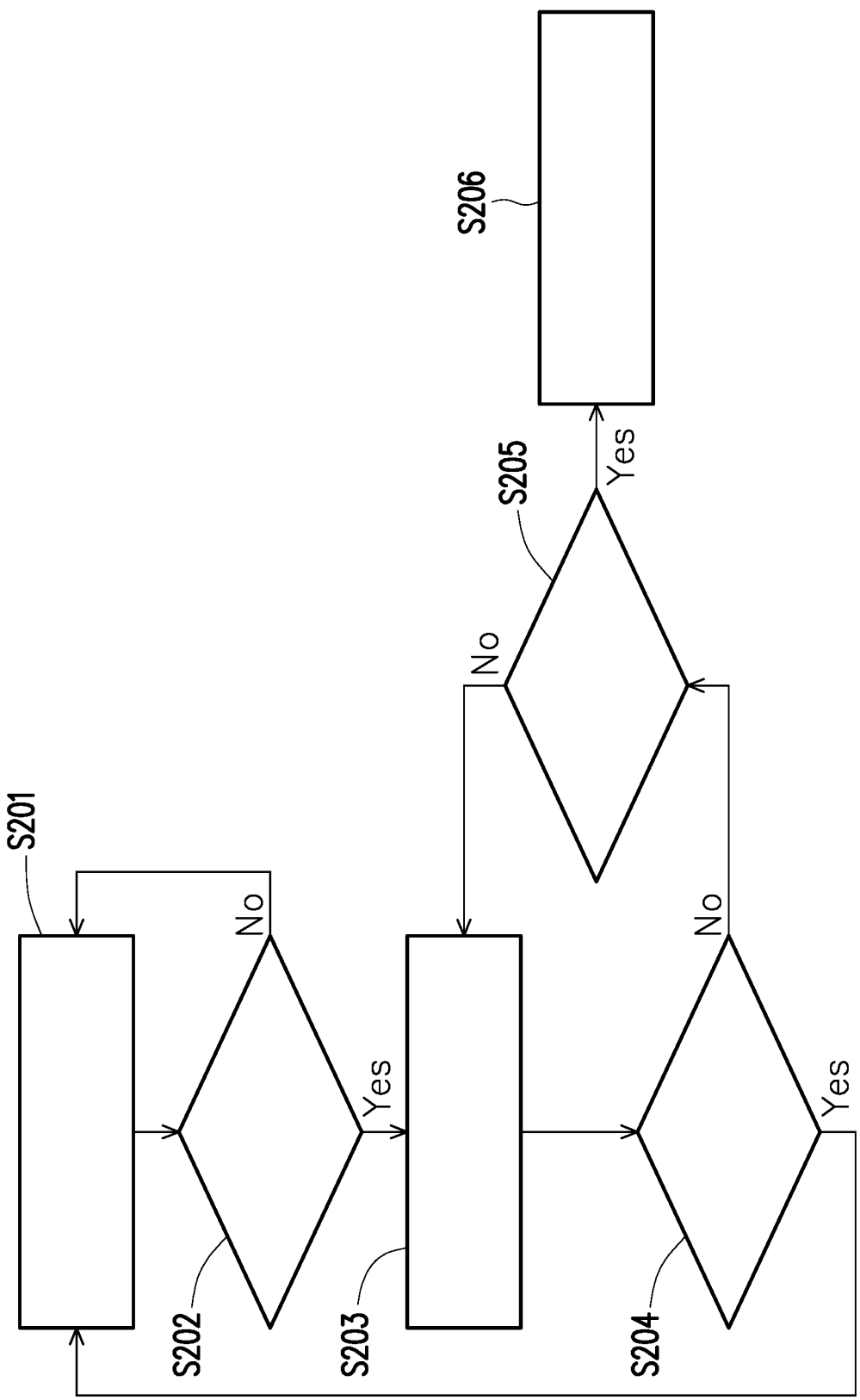
FIG. 2 is a flowchart of a projector booting method according to an embodiment of the disclosure.

FIG. 2 is a flowchart of a projector booting method according to an embodiment of the disclosure.

Referring to FIGS. 1 and 2, in Step S201, a processor 130 waits to receive an input data.

In Step S202, the processor 130 determines whether the input data matches a preset data.

If the input data does not match the preset data, the process returns to Step S201.

If the input data matches the preset data, the process proceeds to Step S203. In Step S203, the processor 130 starts a timer and waits for a booting signal.

In Step S204, the processor 130 determines whether the timer has expired (for example, five minutes).

If the timer has expired, the process returns to Step S201.

If the timer has not expired, the process proceeds to Step S205. In Step S205, the processor 130 determines whether the booting signal is received.

If the booting signal is not received, the process returns to Step S203, the processor 130 waits for a booting signal and does not restart the timer.

If the booting signal is received, the process proceeds to Step S206. In step S206, the processor 130 transmits a light source driving signal to a light source actuator 140 to turn on a light source 150.

Based on the above, the projector and the projector booting method of the disclosure compare the input data with the preset data. The processor starts the timer after determining that the input data matches the preset data. The booting operation is executed to turn on the light source only if the processor receives the booting signal before the timer expires. Therefore, when the user is within the projection area of the projector and accidentally touches the booting button, the projector will not be immediately turned on. Users who do not know the input data or are unable to pass the authentication are also unable to directly start up the projector. In addition, the projector cannot be start up until the user has passed the authentication so that power wastage used for turning on the projector to allow the user to input the authentication data and power wastage due to failure of authentication can be minimized.

Although the disclosure has been disclosed by the embodiments above, the disclosure is not limited to the embodiments. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector comprising a receiver device, a storage device, and a processor, wherein
the receiver device is used for receiving an input data; and
the processor, coupled to the receiver device and the storage device, is used for comparing the input data with a preset data in the storage device, starting a timer after determining that the input data matches the preset data, and transmitting a light source driving signal to a light source actuator to turn on a light source when the processor receives a booting signal before the timer expires,
wherein the receiver device comprises a booting button, and the processor transmits the light source driving signal to the light source actuator to turn on the light source when the processor receives the booting signal of the booting button for a predetermined number of times within a predetermined time interval or when the processor continuously receives the booting signal of the booting button within a predetermined time interval.

2. The projector according to claim 1, wherein the processor does not transmit the light source driving signal to the light source actuator when the processor receives the booting signal after the timer expires.

3. The projector according to claim 1, wherein the processor waits for the booting signal when the processor does not receive the booting signal before the timer expires.

4. The projector according to claim 1, wherein the receiver device comprises an infrared sensor, the input data is a button input sequence of a remote control, the preset data is a preset button input sequence, and the button input sequence is received by the receiver device at a predetermined time interval.

5. The projector according to claim 1, wherein the receiver device comprises an image sensor, the input data is an input image, the processor executes image recognition on the input image to obtain a hand gesture, and the preset data is a preset hand gesture.

6. The projector according to claim 1, wherein the receiver device comprises an image sensor, the input data is a 2D barcode image captured by the image sensor, and image recognition is executed by the image sensor to obtain an information corresponding to the 2D barcode image.

7. The projector according to claim 1, wherein the receiver device comprises a radio wave receiver, the input data is an identification code obtained from a radio wave, and the preset data is a preset identification code.

8. The projector according to claim 1, wherein the receiver device comprises a sound source receiver, the input data is a voice segment, the processor executes voice recognition on the voice segment to obtain a voice command, and the preset data is a preset voice command.

9. The projector according to claim 1, wherein the receiver device comprises a wireless network module, the input data is a password, and the preset data is a preset password.

10. A projector booting method, for a projector comprising a receiver device, a storage device, and a processor, wherein the processor is coupled to the receiver device and the storage device, the projector booting method comprising:
receiving, by the receiver device, an input data;
comparing, by the processor, the input data and a preset data in the storage device;
starting a timer, by the processor, after determining that the input data matches the preset data; and
transmitting a light source driving signal, by the processor, to a light source actuator to turn on a light source when the processor receives a booting signal before the timer expires,
wherein the receiver device comprises a booting button, and the processor transmits the light source driving signal to the light source actuator to turn on the light source when the processor receives the booting signal of the booting button for a predetermined number of times within a predetermined time interval or when the processor continuously receives the booting signal of the booting button within a predetermined time interval.

11. The projector booting method according to claim 10, wherein the processor does not transmit the light source driving signal to the light source actuator when the processor receives the booting signal after the timer expires.

12. The projector booting method according to claim 10, wherein the processor waits for the booting signal when the processor does not receive the booting signal before the timer expires.

13. The projector booting method according to claim 10, wherein the receiver device comprises an infrared sensor, the input data is a button input sequence of a remote control, the preset data is a preset button input sequence, and the button input sequence is received by the receiver device at a predetermined time interval.

14. The projector booting method according to claim 10, wherein the receiver device comprises an image sensor, the input data is an input image, the processor executes image recognition on the input image to obtain a hand gesture, and the preset data is a preset hand gesture.

15. The projector booting method according to claim 10, wherein the receiver device comprises an image sensor, the input data is a 2D barcode image captured by the image sensor, and image recognition is executed by the processor to obtain an information corresponding to the 2D barcode image.

16. The projector booting method according to claim 10, wherein the receiver device comprises a radio wave receiver, the input data is an identification code obtained from a radio wave, and the preset data is a preset identification code.

17. The projector booting method according to claim 10, wherein the receiver device comprises a sound source receiver, the input data is a voice segment, the processor executes voice recognition on the voice segment to obtain a voice command, and the preset data is a preset voice command.

18. The projector booting method according to claim 10, wherein the receiver device comprises a wireless network module, the input data is a password, and the preset data is a preset password.

* * * * *